UNITED STATES PATENT OFFICE.

HALVOR HALVORSON, OF CAMBRIDGE, MASSACHUSETTS.

IMPROVED EXPLOSIVE COMPOUND.

Specification forming part of Letters Patent No. 43,021, dated June 7, 1864.

*To all whom it may concern:*

Be it known that I, HALVOR HALVORSON, of Cambridge, in the county of Middlesex and State of Massachusetts, have invented certain new and useful Improvements in Explosive Compounds; and I do hereby declare that the following is a full, clear, and exact description of the same.

The object of my invention is to combine the elements of explosives, as far as the characters of such elements will permit, by chemical affinities, thereby producing more homogeneous mixtures and economizing that amount of labor and machinery incident to those mechanical processes involved in the ordinary manufacture of gunpowder. That this object is not new I am fully aware, as the same has been sought in the production of fulminates, gun-cotton, pyroxyline, glonoine, &c. In the production of my explosive I have sought to employ similar elements to those of gunpowder and to devise the means by which affinities should be so controlled that combinations might be effected, fitting the products to all the conditions for which that material is adapted.

The effect upon ligneous matter treated with nitric acid is well known, as well in regard to its combustibility as its preservation, the first character being typified in gun-cotton, the latter in artificial parchment. On account of its attenuation and the convenience of obtaining it, I have selected sawdust from veneer-saws, and that readiest at hand has been from rosewood. This I have treated with diluted nitric acid—seventy-five per cent. acid, specific gravity 1.40—with twenty-five per cent. water, in volume, until fumes of nitrous acid begin to be evolved, when I immediately decant the liquid and thoroughly wash the dust and dry it under any known circumstances, either by sun, draft, or artificial heat. The dust in this stage of my process will be found changed in color and more combustible than before the treatment. It will here be observed that I deviate from the treatment of cotton or paper, in the production of gun-cotton or artificial parchment, in continuing the action of the acid until its decomposition commences, as indicated by the evolution of nitrous acid. The acid, as decanted from the sawdust, as well as the first two washings, is saved and utilized, as hereinafter specified. The dried sawdust is now submitted to one or two processes, depending on conditions and circumstances hereinafter to be described, whether in conjunction with the employment of the before-mentioned acid and washings or not. The object of this or these processes is to combine the dust with cyanogen or sulphur, or both, which may be done in various ways.

From the character of cyanogen the chemist will infer its employment in this case indirectly. This I accomplish, first, by dyeing the sawdust heavily with some preferably insoluble cyanic salt, such as the ferrid-cyanide of iron or Prussian blue. This I accomplish by saturating the sawdust with nitrate of iron, and then treating the thus saturated dust with a solution of ferro-cyanide of potassium. This imbues the ligneous particles with common Prussian blue, whose popular formula is written $Fe_7 Cy_9$.

As the ignition is much enhanced by cyanogen, I prefer to imbue the dust with another Prussian blue of my own invention, instead of the common, containing another atom of cyanogen, a description of which will be found in another paper specifically prepared on that subject. The dust in this condition is easily ignited, and with oxygen sufficient to sustain the combustion of the carbon of the ligneous matter, as well as that of the cyanogen, whereby its nitrogen is liberated, eudiometric results are obtained of great interest and importance.

The other mentioned process to which the azotized sawdust may be submitted is to saturate it with a solution of any of the alkaline sulphides and decompose such sulphide with some acid of which the resulting salts may be desirable, while the sawdust will be impregnated with the eliminated sulphur of the sulphide employed.

The third treatment to which the sawdust may be subjected for the purposes under consideration is to deposit in its pores a sulpho-cyanide. I prefer that of copper, by well-known double decomposition, through successive applications to the dust of a solution of a cupreous salt and that of a sulpho-cyanide.

The sawdust, being thus prepared in any of these described ways, is to be mixed with any body capable of yielding oxygen for its combustion. For this purpose I prefer a mixture of two parts of chlorate of potassa to one part of nitrate of the same base, by weight, or a salt, hereinafter to be described, resulting from the acid hereinbefore mentioned, and of this mixture I employ equal parts, by weight, with that of the impregnated sawdust. To avoid the dangers attending the grinding together or trituration of these ingredients, on account of the peculiar character of the chlorate of potassa, I make a warm saturated solution of the two salts and immerse the dust in this solution under constant agitation. By this means the dust becomes thoroughly impregnated with the salts and the agitation prevents a regular crystallization. When I think the dust is saturated with this solution, and continuing the agitation, I avail myself of the insolubility of the salts under consideration in alcohol, and applying this agent copiously and rapidly the whole mass is soon precipitated in intimate combination and in a doughy condition, when it may be molded into cartridges, as described in another specification devoted to that subject, or treated like common gunpowder-paste for granulation.

The combination of ligneous matter with cyanogen, sulphur, or sulpho-cyanogen being a marked feature of my invention, I occasionally avail myself of the solubility of Prussian blue in oxalic acid, by which means ligneous or any porous body may readily be imbued with Prussian blue, and either holding the oxalic acid as an additional source of carbon in the explosive, or it may be removed by alcohol, in which it is soluble, the alcohol in all these employments being recoverable by distillation for repeated uses.

The time has now arrived to consider the disposition to be made of the acid employed in the first treatment of the sawdust and what is removed from the dust and held in solution by the acid. If this acid solution be treated with a soluble sulphide, an organic sulphide and a nitrate of the base of the applied sulphide will result, the former as a precipitate, to be collected, washed, and dried, to be employed as a carbo-sulphide in the explosive, and the nitrate of potassa, if sulphide of potassium were the decomposing salt employed, to be crystallized and employed as above indicated. However unimportant this fact may be in this immediate connection, its general application in organic chemistry opens a wide field; but while the action of nitric acid on many organic bodies reveals so many wonderful phenomena, that on salicine, indigo, and the aniline family of substances suggested its results here as conducive to my object of more important results than its conversion into a sulphide. Upon such analogy I concentrate this acid solution, during which heavy volumes of nitrous fumes occur, on which account precautions must be taken to avoid their inhalation. A crystalline body results of marked acid properties and capable of forming well-defined salts, those of potassa and ammonia being permanent, that of soda deliquescent. This acid and salts, except the soda, deflagrate on coals, but not quite as violent as the picric acid and its salts. It is the potassa or ammonia salt of this acid I propose to employ in conjunction with chlorates of potassa in the manufacture of my explosive, preferring the ammonia salt as being the most energetic, and as diminishing the solid residual of the deflagration or combustion of the compound. The production of this acid from rose-wood sawdust is attended also with evolution of prussic acid, which is of interest in a scientific point of view; but for the technicality under consideration, other woods undoubtedly would produce equally satisfactory results. As a test for such conclusion the results of the oxidation of satin wood, *Sanguinaria Canadensis*, *Capsicum Africana*, *Ulmus rubra*, *Hydrastis Canadensis* have been tried and samples produced; but however felicitous woods may seem, the combination of sulphur with organic matter and oxidized carbonaceous or vegetable substances, when such exist in solution, they appear to be better adapted to the end in view, and when in addition to this such conditions are attainable inadvertently the subject becomes still more inviting and more important. In this relation the residuums of petroleum or coal-oil works present the inviting field. If the sulphuric acid "bottoms," as they are called, from such works are first treated with water, a decomposition occurs by which a dark oleaginous matter is separated and floats upon the other or more aqueous or acid character. By long repose a pitchy-looking matter collects and interposes itself between the said acid and lower and oleaginous and upper part of the decomposition. When this has occurred the acid portion is clear and transparent and of a reddish-brown color. If this matter is treated with alkaline sulphides, mutual decomposition ensues and a sulphide precipitates, while an alkaline sulphate remains in solution. For this operation I prefer the sulphide of ammonium, as the sulphate of that base is more valuable than that from either potassa or soda. By whatever agent this decomposition is effected, the utmost caution is indispensable, as a complicated and very deleterious gas is copiously evolved, and of which one single inspiration will prostrate the operator to the floor, with only a momentary consciousness of a green hue cast upon all surroundings, a ringing noise in the ears and a coma, from which resuscitation may be doubtful unless immediate and energetic stimulants, pure air, and cold water to the head are obtained and administered. A revival from one of these swoonings is followed by weakness of the entire vertebra, trembling, headache, and anxiety for hours after return of consciousness. This is the writer's single experience, without a desire for repetition, even under the auspicious presence of the energetic and judicious assistant who witnessed the scene described. This gas is sulphureted hydrogen evolved from the sulphide, blended with some cyanogen compound extant in the bottoms and liberated under the conditions of the decomposition. The supernatant solution, after the subsidence of the organic sulphide, reacts on iron like a sulpho-cyanide. Its constitution has not been definitely studied.

By the decomposition of this new sulphide with nitric acid nitrous acid is abundantly generated, and leaves as a residuum pure sulphur to the extent of sixty-five per cent. of the sulphide thus decomposed. The oxidized matter crystallizes from a hot concentrated solution, reddens litmus-paper strongly, and makes salts with bases, those of soda and ammonia being characterized as follows: The soda salt is deliquescent, the ammonia salt detonating. The resemblance between the sulphide precipitated from these bottoms and that from wood sawdust solution in nitric acid, above described, and the alkaline salts from the acids from woods and those from the bottoms, as well as other combinations, is striking enough to amount almost to identity. The large proportion of sulphur eliminated from the sulphides of the bottoms may be accounted for, first, by the large amount of sulphuric acid contained in the bottoms, and, secondly, by the excess of sulphur in the commercial sulphide of potassium employed in the experiments which have thus far been made. When the matter held in solution by the sulphuric acid of these bottoms shall have been thoroughly studied, its constitution defined, its atomic weight established, I have no doubt that an infinitely less amount of sulphur will prove a proper equivalent, and that it is of basic properties, and whose nomenclature is yet to be proclaimed.

Until the problems above named are solved by analysis, and its formula shall suggest a name, I will take the liberty to call it "petrulmine"—not a very classic name, to be sure, but it will bear comparison with such a name as "saculmine" when applied to the remotest products from sugar. The sulphide of petrulmine, then, I propose to employ as a carbo-sulphide in an explosive compound.

If the bottoms referred to, instead of being treated with a sulphide, are treated with a nitrate, a sulphate of the base of the nitrate will result and decomposition of nitric acid takes place. If a nitrate is added, as long as nitrous fumes are evolved, supposing it to be a nitrate potassa, and the mass heated to boiling at intervals and left to spontaneous crystallization, it will be found necessary to add carbonate of potassa till effervescence ceases, enough to convert the bisulphate of this base into a neutral sulphate. A small amount of nitrate and nitrite of potassa will also occur; but when the crystals formed give a turquois-colored precipitate with a salt of copper the supernatant solution should be decanted. This is a solution of petrulminiate of potassa, which, when decomposed with tartaric acid, will yield on evaporation petrulminic acid. This acid is susceptible of forming the same salts which were obtained from the petrulmine when a sulphide by oxidation with nitric acid, hereinbefore mentioned, was used; but as the ammoniacal salt affords an element in my explosive every way desirable and more preferable than the acid, I propose to decompose the bottoms with nitrate of ammonia, which can be obtained cheaply at gas-works, and neutralize the resulting petrulminic acid with the ammonia of the sulphate formed, and then employ this petrulminiate of ammonia in combination with chlorate of potassa, or, better still, perchlorate of ammonia, as the deflagrating element of my powder.

The only question in regard to perchlorate of ammonia in this connection is price.

It will be seen that no residue can possibly result from a combination of perchloric acid, ammonia, carbon, and sulphur. The combustion can be productive of nothing but expansible gases.

What I therefore claim as my invention, and desire to secure by Letters Patent, is—

The combination of an organic sulphide and a cyanide or ferrid-cyanide with an organic deflagrating ammoniacal salt and a chloric or perchloric salts of potassa and ammonia, as and for the purposes described.

This specification signed this 11th day of March, 1864.

H. HALVORSON.

Witnesses:
THOS. T. EVERETT,
DAN ROWLAND.